United States Patent
Matsushita

(10) Patent No.: US 6,546,355 B2
(45) Date of Patent: Apr. 8, 2003

(54) ABS SHAPE CORRECTION METHOD FOR SLIDER OF MAGNETIC HEAD, AND ABS SHAPE CORRECTION APPARATUS FOR SLIDER OF MAGNETIC HEAD

(75) Inventor: Naohisa Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 26 days.

(21) Appl. No.: 09/799,420

(22) Filed: Mar. 5, 2001

(65) Prior Publication Data

US 2001/0056334 A1 Dec. 27, 2001

(30) Foreign Application Priority Data

Jun. 20, 2000 (JP) ........................................ 2000-185096

(51) Int. Cl.$^7$ .............................................. G01C 17/00
(52) U.S. Cl. ..................................... 702/152; 360/235.4
(58) Field of Search ..................... 702/152; 360/235.4, 360/236.6; 356/497

(56) References Cited

U.S. PATENT DOCUMENTS 5,266,769 A  11/1993  Deshpande et al.
5,345,353 A  * 9/1994  Krantz et al. ............. 360/236.6
5,471,303 A  * 11/1995  Ai et al. .................... 356/497
6,181,517 B1 * 1/2001  Yanagisawa et al. .... 360/235.4

FOREIGN PATENT DOCUMENTS

JP  6-84312  3/1994

* cited by examiner

*Primary Examiner*—John Barlow
*Assistant Examiner*—Xiuqin Sun
(74) *Attorney, Agent, or Firm*—Greer, Burns & Crain, Ltd.

(57) ABSTRACT

Three-dimensional positions on an ABS of a slider of a magnetic head are measured, and an interpolated surface 63 is generated by interpolating all the measured points. A processing center position of the magnetic head is calculated based on the interpolated surface, and a plurality of lines parallel with the processing center position are processed. It is also possible to process, by irradiating energy corresponding to a difference between a final target correction volume and a measured value, without forming an interpolated surface.

6 Claims, 20 Drawing Sheets

Fig. 15

| PROCESSING CONDITIONS | | | DEFORMATION AMOUNT (nm) |
|---|---|---|---|
| IRRADIATION ENERGY (W) | SCANNING SPEED (mm/sec) | LINE WIDTH (μm) | |
| 2W | 10 | 100 | 30 |
| 1W | 10 | 100 | 15 |

Fig.16

| PROCESSING CONDITIONS | | DEFORMATION VOLUME | |
|---|---|---|---|
| IRRADIATION ENERGY (JOULE/PULSE) | IRRADIATION SPOT DIAMETER (μm) | MAXIMUM DISPLACEMENT (nm) | INFLUENCED RANGE AREA DIAMETER (μm) |
| 0.02 | 100 | 3 | 150 |
| 0.01 | 100 | 1.5 | 100 |

ABS SHAPE CORRECTION METHOD FOR SLIDER OF MAGNETIC HEAD, AND ABS SHAPE CORRECTION APPARATUS FOR SLIDER OF MAGNETIC HEAD

BACKGROUND OF THE INVENTION

1. Field of the Invention

The present invention relates to an ABS (Air-Bearing Surface) shape correction method for a slider provided on the tip portion of a magnetic head, and an ABS shape correction apparatus for a slider of a magnetic head.

2. Description of Related Art

FIG. 1 is a perspective view schematically showing one example of a slider of a magnetic head that has an ABS. In FIG. 1, a reference number 1 denotes a slider of a magnetic head that faces a magnetic disk. In order to keep a constant floating volume above the slider, floating surface rails 2, 3 and 4 are provided. During a recording or a reproduction of a magnetic disk, the floating surface rails 2 to 4 face the surface of the magnetic disk (not shown).

Based on the existence of the floating surface rails 2, 3 and 4, a constant distance is maintained between the magnetic disk and the surface of the slider. In other words, a constant floating height of the slider is maintained. This constant floating height is maintained for the following reason. When there arises a difference between the pressure in the gap formed between the magnetic disk and the portions where the floating surface rails exist and the pressure formed between the magnetic disk and the portions where the floating surface rails do not exist, the pressure is balanced between these two gaps.

The surface of the floating surface rails will be called an ABS. The surface of the slider at portions where there is no floating surface rail, that is, the surface of the slider facing the surface of the magnetic disk, will also be called an ABS. In order to prevent the ABS from being adsorbed by the magnetic disk and, also, in order to stabilize the floating characteristics of the slider, the ABS must be a flat surface, in general, except in the case where the ABS has a special shape. Particularly, flattening of the ABS has been increasingly required under the current situation where the floating height between the magnetic disk and the ABS becomes smaller with a reduction in the size of the magnetic head.

However, the ABS is distorted for various reasons. The distortion of the ABS is classified into the following three types. As schematically shown in FIG. 1, the ABS is distorted in a direction parallel to the rotation direction of the magnetic disk. This is called a crown. The ABS is also distorted in a direction orthogonal to the rotation direction of the magnetic disk. This is called a camber. A third type of distortion is that the ABS is distorted in a direction twisted from the rotation direction of the magnetic disk. This is called a twist.

To flatten the ABS, radiation of energy such as a laser beam, a diamond point or an ion mill is applied onto the ABS or its rear surface, thereby correcting the shape of the ABS. In other words, when one of these types of radiation is applied onto the ABS, the stress of the ABS changes. Thus, the distortion of the ABS is corrected. In this case, the correction volume is different depending on a processing condition such as the size of the irradiation energy.

The processing conditions of the ABS may be determined based on a visual observation of numerical values of crown or camber obtained from an exclusive apparatus for measuring the shape of the ABS or values given on a display according to a light interference method or the like.

As a conventional ABS shape correction method, the method as disclosed in Japanese Patent Application Laid-open Publication No. Hei 6-84312 has been known.

FIG. 2 is a side view of a conventional slider having a crown-shaped ABS and a magnetic disk as disclosed in Japanese Patent Application Laid-open Publication No. Hei 6-84312. In FIG. 2, a reference number 21 denotes a slider of a magnetic head, 22 denotes an arm of the magnetic head, and 23 denotes a magnetic disk. As shown in FIG. 2, the slider 21 has a crown shape distorted in a direction parallel with the rotation direction of the magnetic disk 23. The line of a mountain ridge of this crown shape is in line contact with the magnetic disk 23.

In the conventional slider shown in FIG. 2, it is desired that the ABS is in a crown shape, and it has been a main object to correct this crown shape. For this purpose, a method has been employed that a centerline position of the slider in a longitudinal direction is line scanned by an He-Ne laser beam or the like, and the crown volume is measured from an expanded angle of a reflection beam, and processing conditions are determined based on a result of this measurement. In order to control the crown volume, a plurality of straight lines are processed or a wide area is processed, based on the centerline position of the slider in principle.

According to the above publication, however, there is no clear expression about what type of pattern is to be processed. The publication only discloses that, for correcting a distortion in the crown direction, a plurality of straight lines are processed in a direction forming a right angle with the crown, and for correcting a distortion in the camber direction, a plurality of straight lines are suitably processed in a direction forming a right angle with the camber.

Further, there is no clear disclosure about a control method for correcting to a particularly desired shape.

FIG. 3 is a side view of a stiction free slider provided with legs on the surface that faces a magnetic disk in order to prevent an adsorption, and a magnetic disk. In FIG. 3, a reference number 31 denotes a slider, 32 denotes an arm, 33 and 34 denote legs for preventing adsorption, 35 and 36 denote floating surface rails, 37 denotes a read/write element provided on the slider 31, and 38 denotes a magnetic disk. In this case, the surface of the floating surface rails 35 and 36 is an ABS.

In this slider provided with the legs for preventing adsorption, it is required that the ABS is formed in a flat shape instead of a crown shape as disclosed in the above publication.

The present invention is intended to provide an ABS having a flat shape.

The ABS of a slider as shown in FIG. 3 receives a mechanical deformation due to grinding during a process of processing the slider, or by a residual stress due to lapping. Based on the combination of the shapes of the floating surface rails 35 and 36 formed by the dry etching processing and ion mill processing, the ABS does not have a simple shape of any one of the defined crown, camber and twist, but tends to have a more complex shape. Therefore, in order to correct the ABS shape with higher precision, it is necessary to evaluate the shape of the whole surface. However, according to the method disclosed in the above publication, only the position of the centerline of the slider is recognized, and the evaluation of the whole shape of the ABS has been insufficient.

Further, according to the method of determining processing conditions by visual observation of a result of the measurement, it is only possible to determine a bottom position or a position of a line of a ridge based on intuition. Thus, it has been difficult to automatically and accurately determine a processing position.

Further, when various factors such as processing conditions and material characteristics are always constant, it is always possible to carry out a stable correction by setting constant processing conditions, and a satisfactory correction can be obtained by one process. However, in actual practice, it has been difficult to always carry out a stable correction because of factors such as the surface state of the slider, the components of the materials, and the processing machine.

SUMMARY OF THE INVENTION

The present invention has been made in the light of the above-described problems of the prior-art techniques. It is, therefore, an object of the present invention to provide an ABS shape correction method for a slider of a magnetic head and an ABS shape correction apparatus for a slider of a magnetic head capable of carrying out stable correction of the ABS with high precision in spite of changes in the surface state of the slider, the components of the materials and the characteristics of a processing machine, based on the idea of evaluating the shape of the whole ABS by measuring three-dimensional positions on the ABS of the slider of a magnetic head.

In order to achieve the above object, according to one aspect of the present invention, there are provided an ABS shape correction method for a slider of a magnetic head and an apparatus for implementing this method, the method comprising the steps of measuring three-dimensional positions on the ABS, interpolating the measured points based on data obtained by this measurement, thereby generating an interpolated surface, then calculating a processing center position of the magnetic head based on this interpolated surface, and finally processing a plurality of lines parallel with the processing center position.

According to this aspect, as the three-dimensional positions on the ABS are measured, it becomes possible to evaluate the shape of the ABS.

Further, according to the above aspect, as the three-dimensional measurement is not based on a visual observation, it is possible to automatically and accurately determine a processing position.

Further, according to the above method, it is always possible to carry out a stable flattening correction of the ABS with high precision, without regard for the surface state of the slider, the components of materials and the characteristics of a processing machine.

BRIEF DESCRIPTION OF THE DRAWINGS

FIG. 15 is a table diagram showing one example of the content of a database.

FIG. 16 is a table diagram showing another example of the content of a database.

DETAILED DESCRIPTION OF THE PREFERRED EMBODIMENTS

Embodiment of the present invention will be explained in detail below with reference to the drawings.

Figure 1:
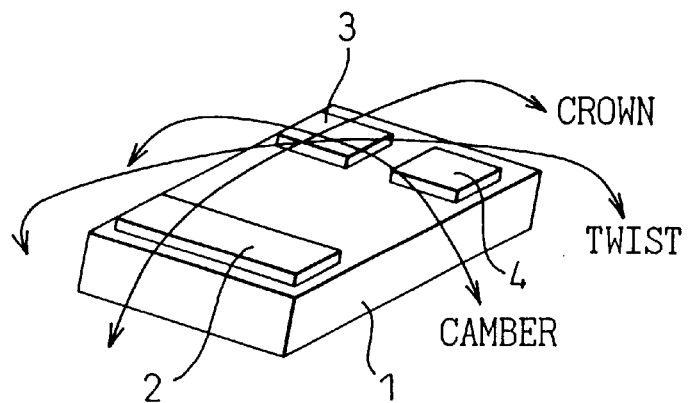
FIG. 1 is a perspective view schematically showing one example of a slider of a magnetic head that has an ABS.
Figure 2:
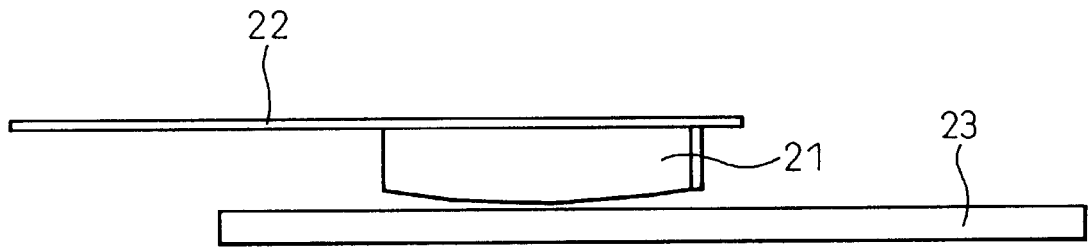
FIG. 2 is a side view showing a conventional slider that has a crown-shaped ABS, and a magnetic disk.
Figure 3:
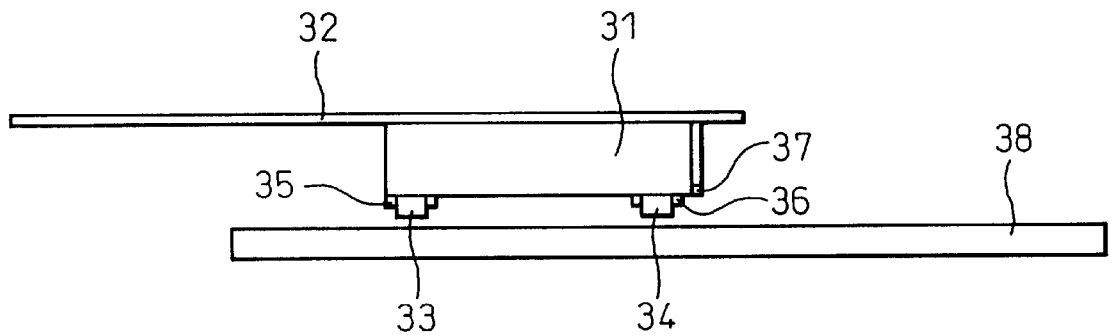
FIG. 3 is a side view of a sticktion free slider provided with legs on the surface that faces a magnetic disk in order to prevent an adsorption.
Figure 4:
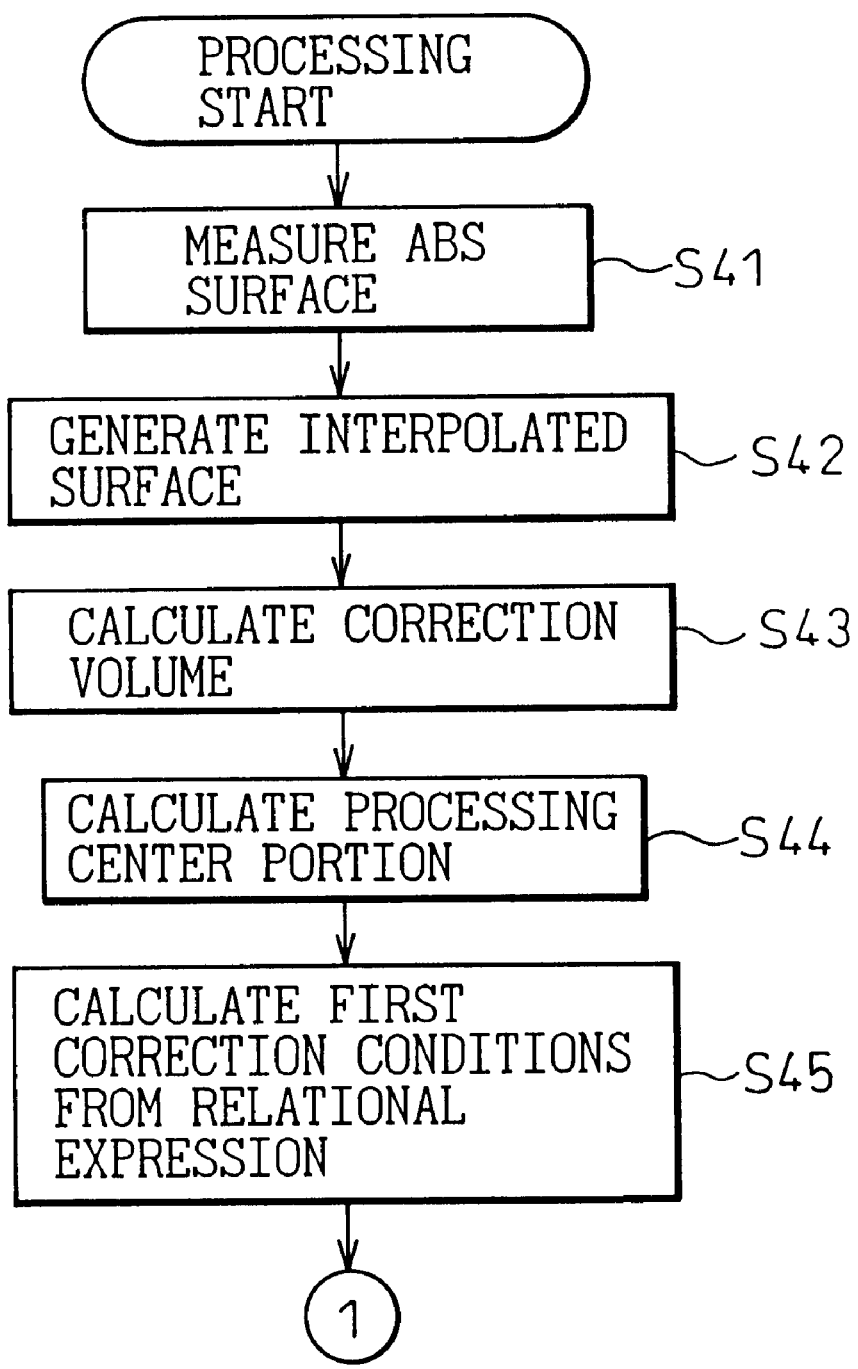
FIG. 4 is a flowchart for explaining an ABS shape correction method for a slider of a magnetic head according to one embodiment of the present invention.

FIG. 4 is a flowchart for explaining an ABS shape correction method for a slider of a magnetic head according to one embodiment of the present invention. Referring to FIG. 4, at step S41, three-dimensional positions on the ABS of a slider of a magnetic head are measured. This measurement is carried out by using a light interference apparatus or by utilizing a reflected laser beam.

At step S42, the whole measured points are interpolated based on data obtained by the measurement at step S41, and an interpolated surface is generated. As one example of this interpolated surface, there is a two-dimensional or higher-dimensional curved surface that includes as many measured points (black circles) as possible. Based on a two-dimensional or higher-dimensional curved surface, the measured points are interpolated smoothly. The measurement and the generation of the interpolated surface at steps S41 and S42 will be explained in further detail with reference to FIG. 5 and FIG. 6.

Figure 5A:
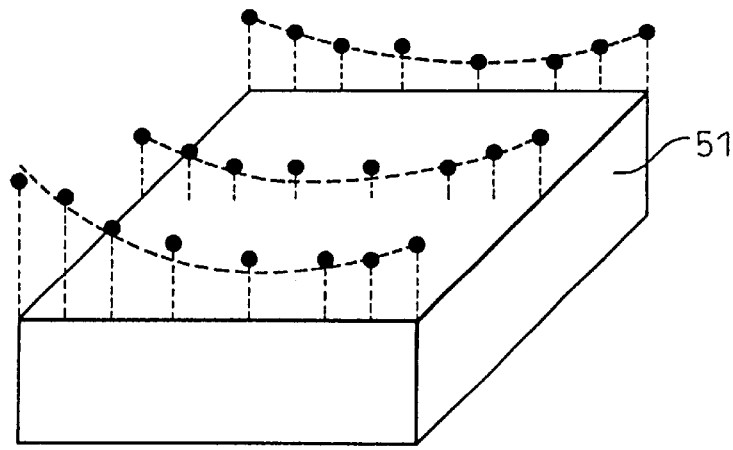
FIG. 5(a) is a view schematically showing measured values of three-dimensional positions of an ABS on a slider before forming floating surface rails.
Figure 5B:
FIG. 5(b) is a view schematically showing an interpolated surface obtained from these measured values.
Figure 5B:
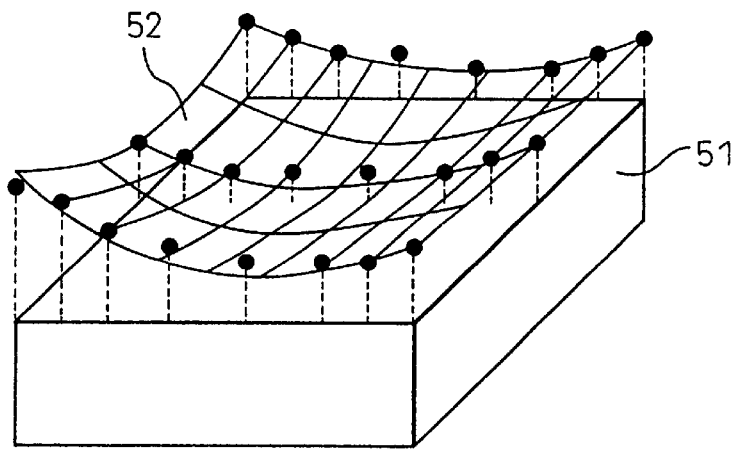

FIG. 5(a) is a view schematically showing measured values of three-dimensional positions of an ABS on a slider before forming floating surface rails, and FIG. 5(b) is a view schematically showing an interpolated surface obtained from these measured values.

Black circles in FIG. 5(a) express the measured values. As shown in this drawing, when the floating surface, before floating surface rails are formed, is an ABS, the ABS shape may be measured three dimensionally to obtain point data by using the light interference apparatus. Alternatively, the ABS shape may be measured three dimensionally to obtain line data (not shown) by utilizing a reflected laser beam.

FIG. 5(b) shows an interpolated surface 52 obtained from these point data or line data. As one example of the interpolated surface, there is a two-dimensional or higher-dimensional curved surface that includes as many measured points as possible. Based on this curved surface, the measured points are interpolated smoothly.

Figure 6A:
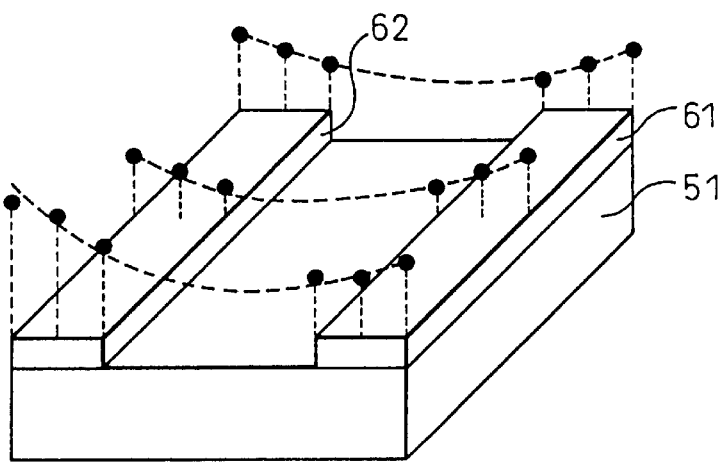
FIG. 6(a) is a view schematically showing measured values of three-dimensional positions of an ABS on a slider after forming floating surface rails.

FIG. 6(a) shows a state where, after floating surface rails 61 and 62 have been formed on a slider 51, three-dimensional positions of a ABS are measured by using the surface of the floating surface rails 61 and 62 as the ABS, and the measured values are schematically shown. As shown in this drawing, the ABS shape of the floating surface rails 61 and 62 may be measured to obtain three dimensional point data by using the light interference apparatus. Alternatively, the ABS shape of the floating surface rails 61 and 62 may be measured three dimensionally to obtain line data (not shown) by utilizing a reflected laser beam.

Figure 6B:
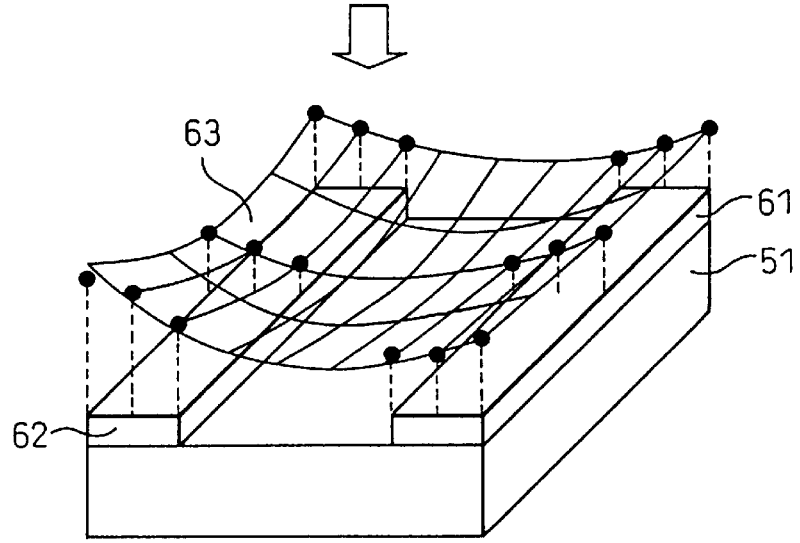
FIG. 6(b) is a view schematically showing an interpolated surface obtained from these measured values.

FIG. 6(b) shows an interpolated surface 63 in the state that the floating surface rail 61 and 62 exist. As one example of the interpolated surface, like in the case of FIG. 5(b), there is a two-dimensional or higher-dimensional curved surface that includes as many black circles of measured points as possible. Based on this curved surface, the whole measured points are interpolated smoothly.

As explained above, in FIG. 5 and FIG. 6, based on the point data or line data obtained by the measurement, the whole surface of the slider is covered, and the measured points are interpolated smoothly to obtain a two-dimensional or higher-dimensional interpolated surface.

As another method of obtaining an interpolated surface, an optimum curve may be generated depending on whether the distorted shape of the ABS of the slider is a crown, a camber or a twist.

Figure 7:
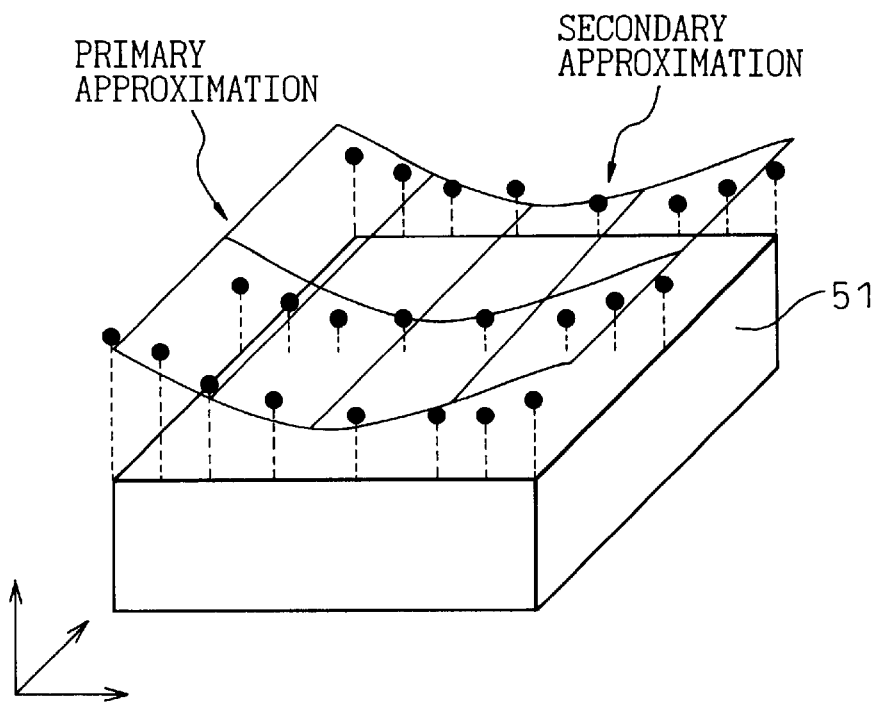
FIG. 7 is a view for explaining a primary approximation and a secondary approximation when an ABS has a crown shape.

FIG. 7 is a view for explaining another method of generating an interpolated surface.

As shown in FIG. 7, when a distortion on the ABS of a slider 51 is a crown that is distorted in a direction parallel to the rotation direction of a magnetic disk, a curved surface is generated by carrying out a primary approximation in the long side direction of the slider 51, and carrying out a secondary approximation in the short direction of the slider 51.

Figure 8:
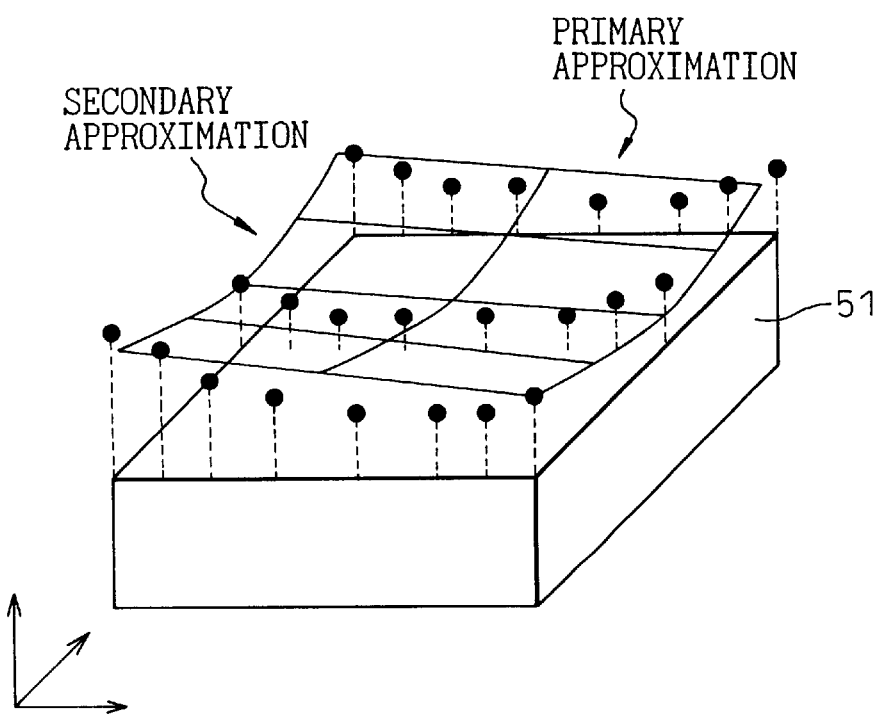
FIG. 8 is a view for explaining a primary approximation and a secondary approximation when an ABS has a camber shape.

FIG. 8 is a view for explaining still another method of generating an interpolated surface.

As shown in FIG. 8, when a distortion on the ABS of a slider 51 is a camber that is distorted in a direction orthogonal with the rotation direction of a magnetic disk, a curved surface is generated by carrying out a primary approximation in the short side direction of the slider 51, and carrying out a secondary approximation in the long side direction of the slider 51.

Figure 9:
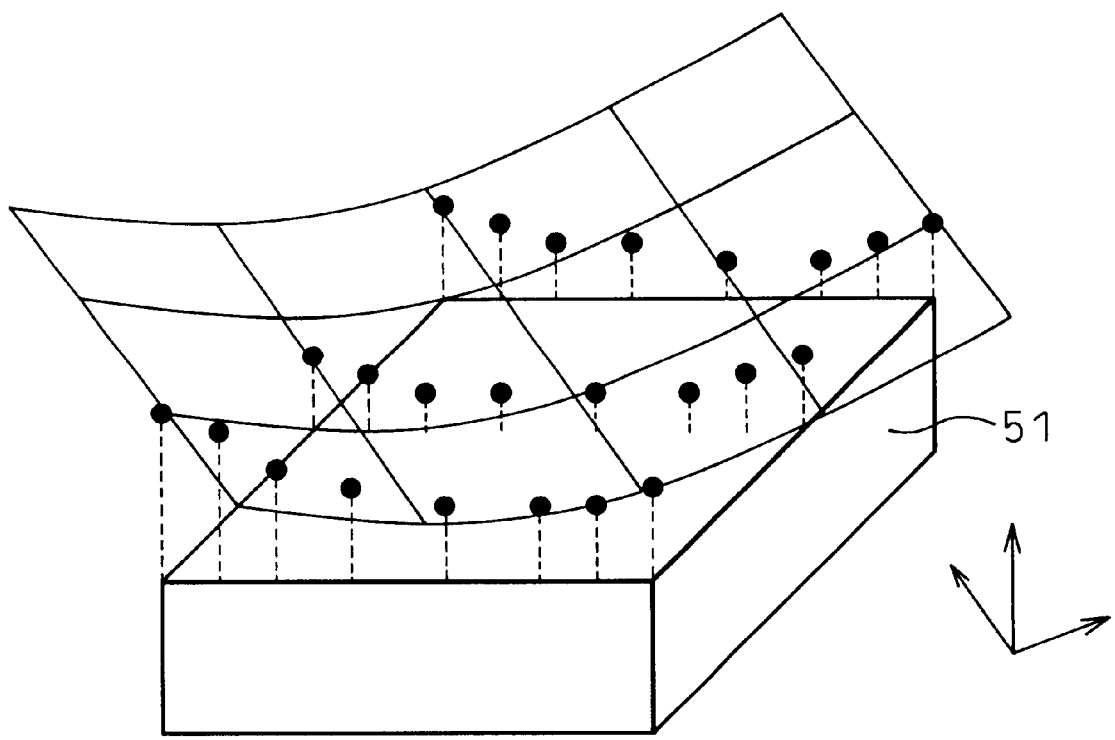
FIG. 9 is a view for explaining a primary approximation and a secondary approximation when an ABS has a twist shape.

FIG. 9 is a view for explaining still another method of generating an interpolated surface.

As shown in FIG. 9, when a distortion on the ABS of a slider 51 is a twist that is distorted in a direction twisted from the rotation direction of a magnetic disk, it is preferable to generate a curved surface by carrying out a primary approximation in the diagonal line direction of the slider 51, and carrying out a secondary approximation in a direction forming a right angle with the diagonal line.

It is preferable to approximate the ABS shape by suitably combining the three types of curve interpolation methods shown in FIGS. 7 to 9.

Figure 10:
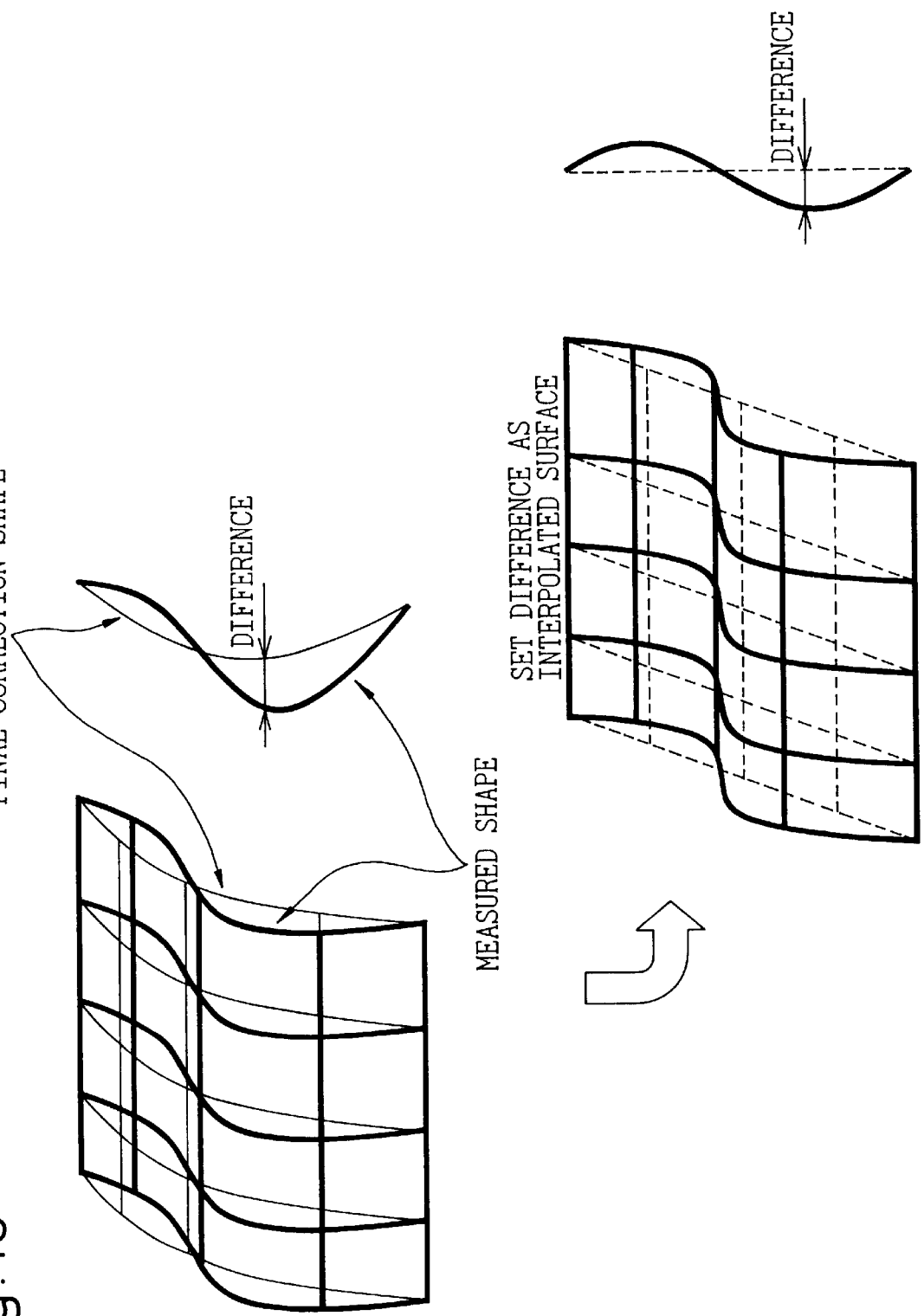
FIG. 10 is a view for explaining a case where a difference between a measured shape and a final correction shape is set as an interpolated surface according to another embodiment of the present invention.

There is also a case where it is desired that a final correction shape of the ABS is not a flat surface. In this case, at step S43 in FIG. 4, a difference between the shape of a measured surface (measured shape) and a final correction shape is made a new interpolated surface, as shown in shown FIG. 10. FIG. 10 shows a case where the shape of the measured surface is a waveform and the final correction shape is a crown shape. In this case, the interpolated surface obtained at step S42 does not correctly represent the difference from the final correction shape. However, when the difference between the interpolated surface and the final correction shape is made a new interpolated surface as shown in FIG. 10, it is easy to obtain the ABS having the desired shape. When the final correction shape is a flat shape, step S43 may be omitted. Further, step S43 may be carried out before executing the primary approximation and the secondary approximation at step S42.

Figure 11:
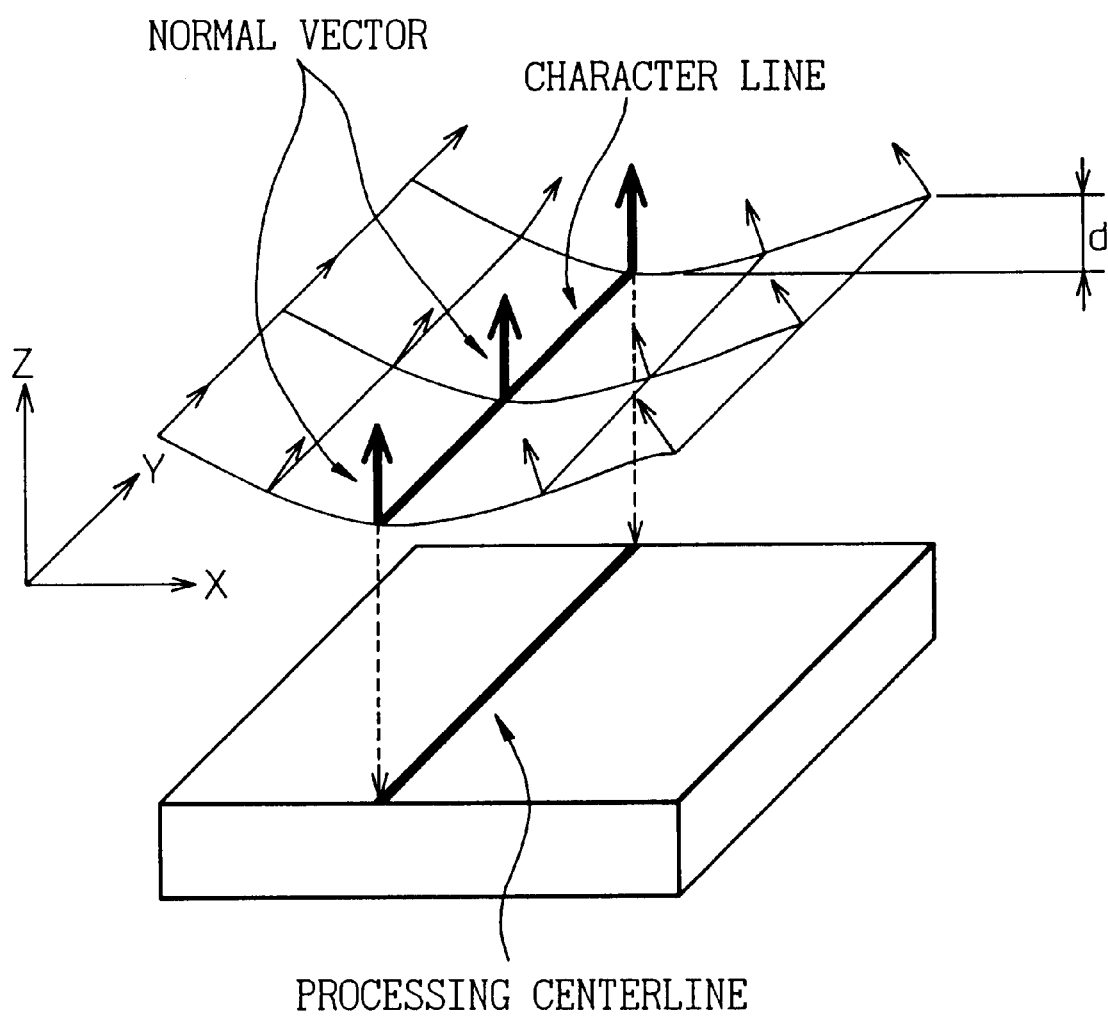
FIG. 11 is a view for explaining how to obtain a character line according to the embodiment of the invention.

FIG. 11 is a view for explaining step S44 in FIG. 4.

At step S44 shown in FIG. 4, a three-dimensional coordinate system is set using the direction of the primary approximation of the generated interpolated surface as an X-axis direction, as shown in FIG. 11. Points having a normal vector parallel with the Z-axis of this coordinate system are connected together, and this is set as a character line. This character line becomes a processing centerline for irradiating energy such as a laser beam (hereinafter, the irradiation energy will be represented by a laser beam).

Figure 12A:
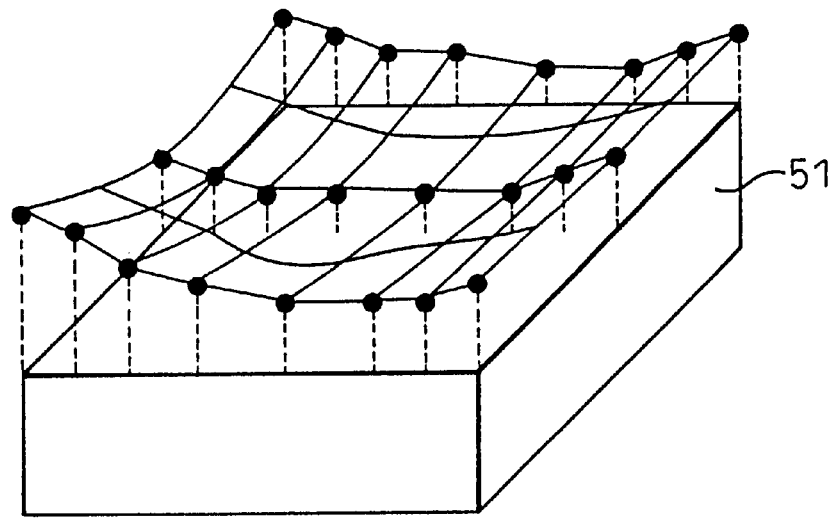
FIGS. 12(a) and (b) are views for explaining a processing centerline in the case where a position of a character line in a height direction is lower than the surrounding.

FIGS. 12(a) and (b) are views for explaining a processing centerline in the case where a position of a character line in a height direction is lower than the surrounding.

Figure 12B:
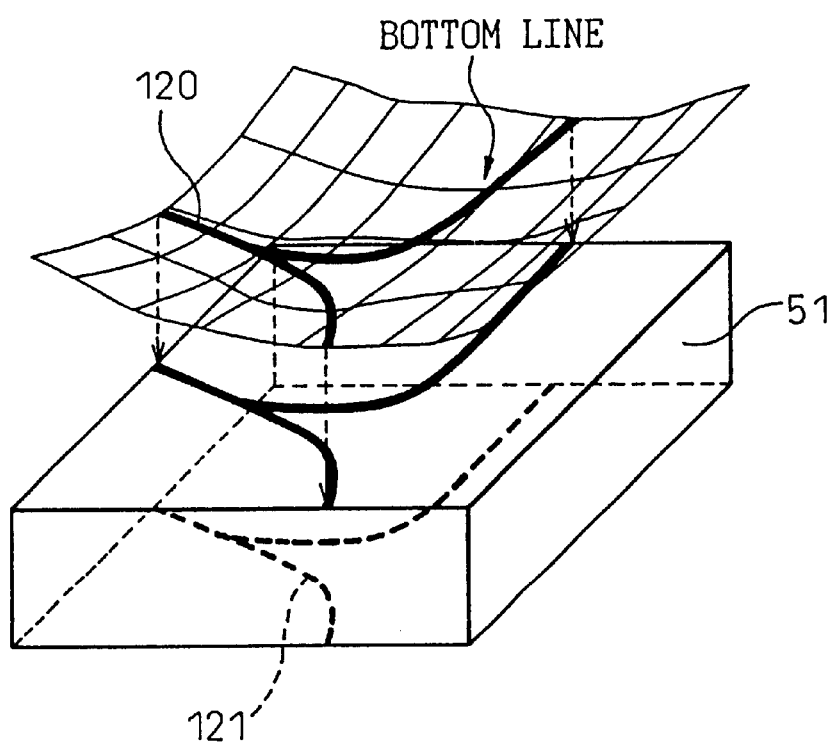

When an interpolated surface that is concave at the center portion has been obtained as shown in FIG. 12(a), a character line 120 becomes a bottom line as shown in FIG. 12(b). In this case, a dotted line 121 on the rear surface of a slider 51 becomes the processing centerline. The dotted line 121 is a line that is obtained by projecting the character line 120 onto the rear surface of the slider 51.

Figure 13:
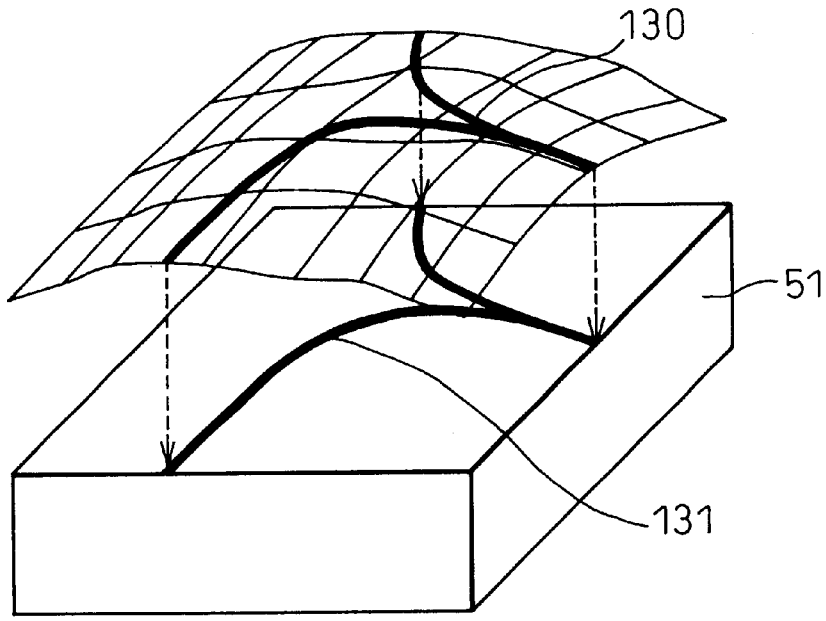
FIG. 13 is a view for explaining a case where a character line becomes a line of a mountain ridge and the surface of a slider becomes a processing centerline.

FIG. 13 is a view for explaining a processing centerline in the case where a position of a character line in a height direction is higher than the surrounding.

As shown in FIG. 13, when the position of a character line 130 in the height direction is higher than the surrounding, this character line becomes a processing centerline. When an interpolated surface that is convex at the center portion has been obtained as shown in FIG. 13, the character line 130 becomes a line of a ridge as shown in FIG. 13. In this case, a line 131 on the rear surface of a slider 51 becomes the processing centerline.

The ABS for detecting a position of a line of a ridge or a position of a bottom line may be an interpolated surface that is approximated by a tertiary or higher level of degree from the three-dimensional point data or may be an interpolated surface that is approximated by a tertiary or higher level of degree from the three-dimensional line data, as described above.

Next, at step S45 in FIG. 4, processing conditions, as first correction conditions for the processing centerline, are determined from data or a relational expression that has been obtained in advance according to the shape of an interpolated cure. This processing will be explained with reference to FIG. 14 to FIG. 16.

Figure 14:
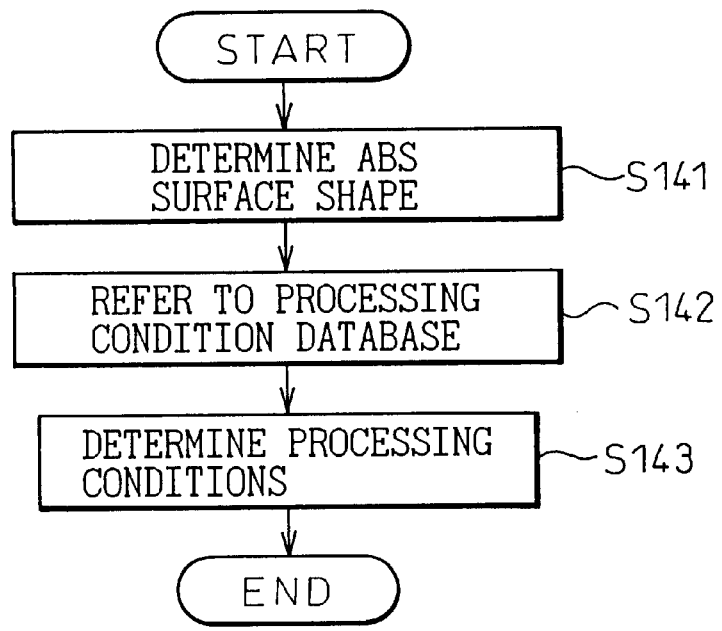
FIG. 14 is a flowchart for explaining a process of determining processing conditions according to the present embodiment.

FIG. 14 is a flowchart for explaining a method of determining an interval between processing lines and a number of processing lines. In FIG. 14, at step S141, the ABS shape of the slider 51, that is, the interpolated surface is determined by the above-described method. At step S142, a processing condition database is referred to.

FIG. 15 is a table diagram showing one example of the content of a processing condition database. This table diagram shows a relationship obtained in advance between processing conditions for carrying out laser-beam processing based on line irradiation and a deformation volume (a difference between the interpolated curve and the final correction shape). In the case of the line irradiation, irradiation energy, a scanning speed, and a line width of a scanning line become the processing conditions as shown in the table. In this example, the scanning speed and the line width are constant regardless of the size of the deformation volume. Therefore, the irradiation energy is changed according to the deformation volume. The deformation volume is substantially proportional to the irradiation energy.

FIG. 16 is a table diagram showing another example of the content of a database. This table diagram shows a relationship obtained in advance between processing conditions for carrying out a laser-beam processing based on a point irradiation and a deformation volume. In the case of the point irradiation, irradiation energy and an irradiation spot diameter become the processing conditions as shown in the table. The deformation volume includes a maximum displacement and an influenced range area diameter. In this example, the irradiation spot diameter is constant regardless of the size of the deformation volume. Therefore, the irradiation energy is changed according to the deformation volume. The deformation volume is also substantially proportional to the irradiation energy.

At step S143 in FIG. 14, processing conditions are determined by referring to one of these databases depending on whether a line irradiation is carried out or a point irradiation is carried out.

The ABS is corrected by irradiating a laser beam onto the processing centerline based on the processing conditions that are determined in the manner as described above. When the deformation of the ABS is mild, it is possible to correct the ABS more smoothly by irradiating the irradiation energy onto a plurality of processing lines that are parallel with the processing centerline around the processing centerline. For example, in FIG. 16, the irradiation energy is 2 W when the deformation volume is 30 nm. In this case, when the deformation is mild, the irradiation energy is divided by five, for example, and each divided irradiation energy amount of 0.4 W is applied to each of the five processing lines.

Figure 17A:
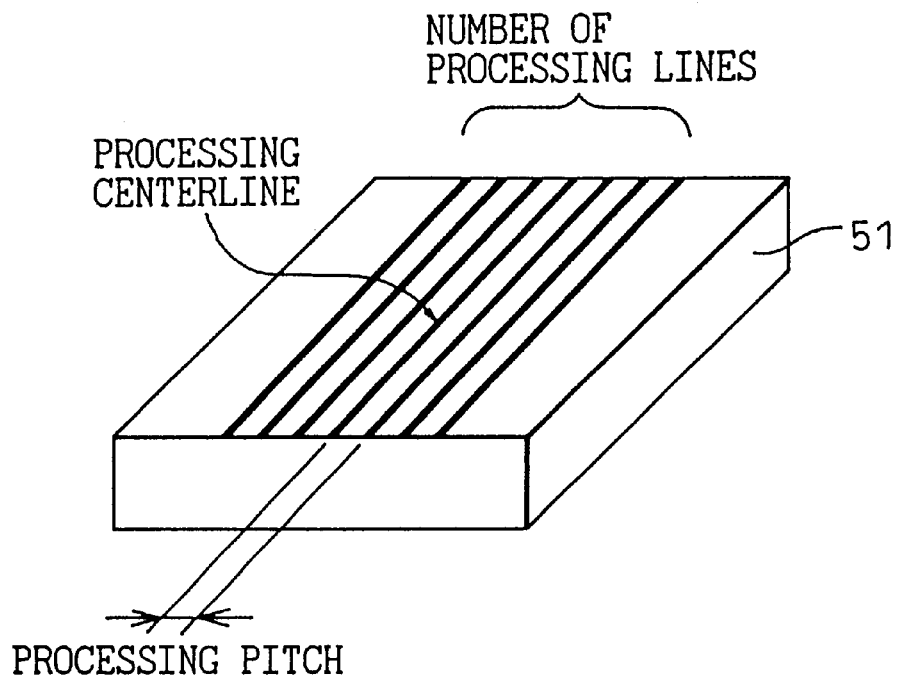
FIGS. 17(a) and (b) are views for explaining an example of processing a plurality of processing lines into a line shape according to the embodiment of the present invention.
Figure 17B:
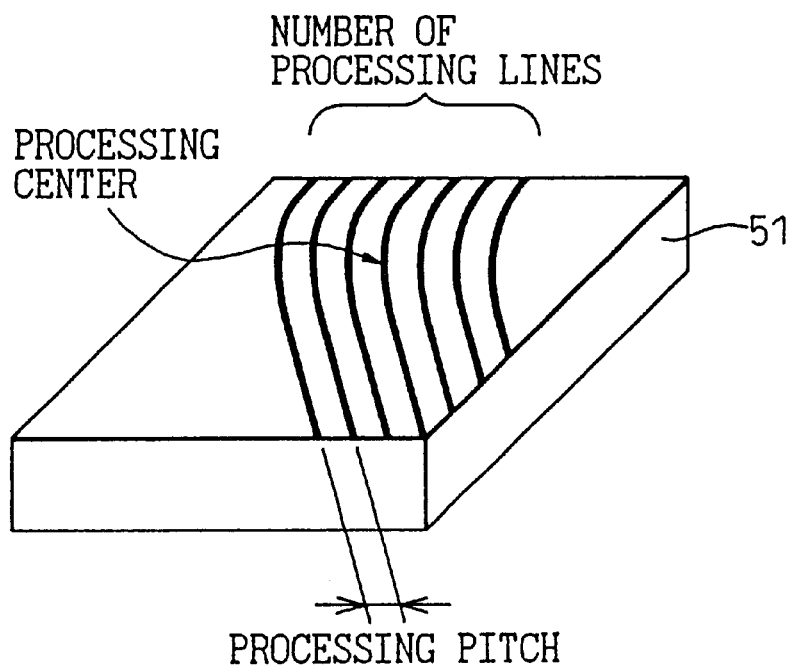

FIGS. 17(a) and (b) show states of before and after a processing in the case of irradiating laser beams onto seven processing lines that are parallel with a processing centerline around this processing centerline. The number of processing lines depends on the size of the degree of the deformation of the ABS. When the level of deformation is sharp, the number of processing lines is made smaller, and when the level of deformation is mild, the number of processing lines is increased. The ABS of a slider 51 shown in FIG. 17(a) is deformed into a shape as shown in FIG. 17(b) by irradiating laser-beam energy onto a plurality of processing lines.

Figure 18A:
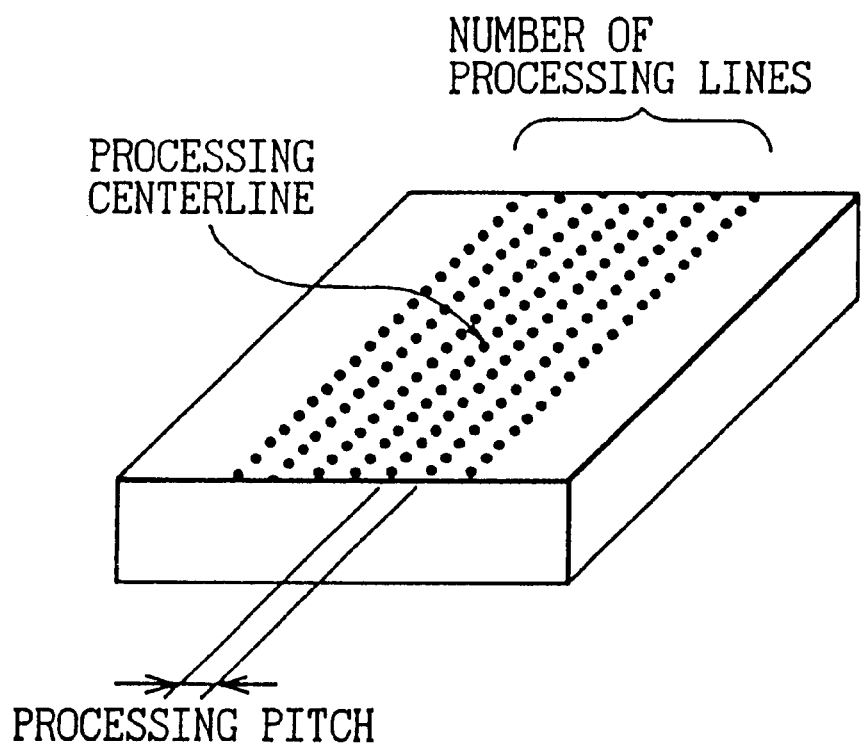
FIGS. 18(a) and (b) are views for explaining an example of irradiating energy onto points of a plurality of processing lines according to another embodiment of the present invention.
Figure 18B:
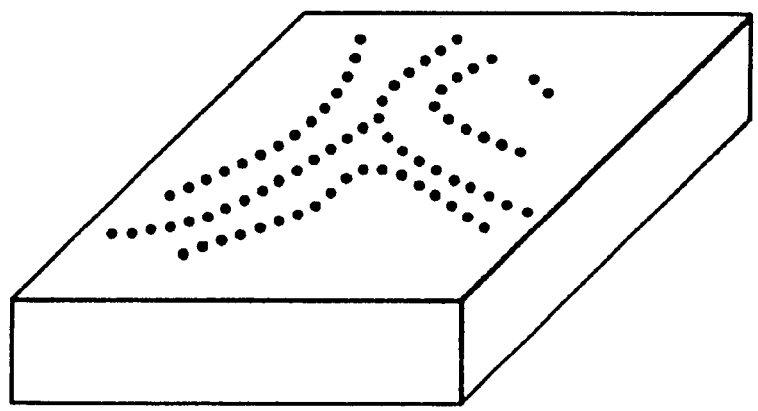

FIGS. 18(a) and (b) show states of before and after a processing in the case of irradiating laser beams onto points of a plurality of processing lines that are parallel with a processing centerline around this processing centerline, according to still another embodiment of the present invention. As shown in these drawings, it is also possible to deform the ABS shown in FIG. 18(a) into the ABS shown in FIG. 18(b) by irradiating energy onto the points on the processing lines. When the energy is irradiated onto the points, the material at the irradiated portions is fused, and the stress on the ABS changes as a result. Thus, it is possible to change the shape of the ABS.

Figure 19:
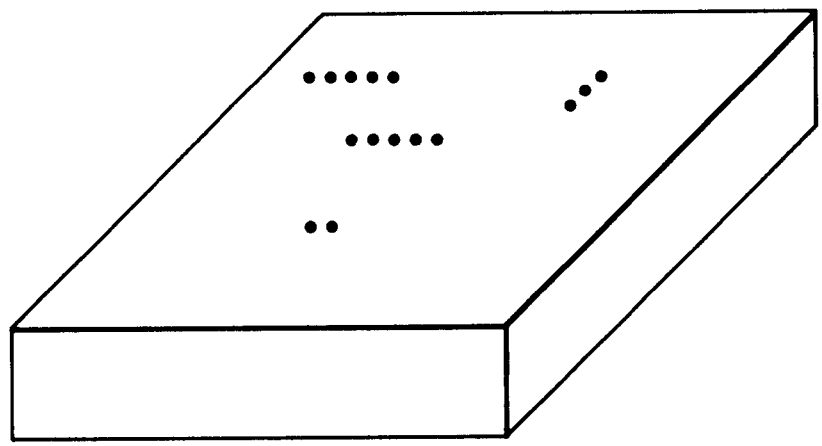
FIG. 19 is a view showing an example of a case where energy is suitably applied to points based on a difference between a final correction shape of an ABS of a slider and three-dimensional positions of measured points.

While the above embodiments explain the case of generating an interpolated surface, according to another embodiment of the present invention, a distortion of the ABS is corrected as follows without generating an ABS. That is, large energy is given to a point where there is a large difference between a three-dimensional position of a final correction shape and a three-dimensional position of a measured point, and small energy is given to a point where there is a small difference between a three-dimensional position of a final correction shape and a three-dimensional position of a measured point. FIG. 19 is a view showing an example of a case where energy is applied to points based on a difference between a final correction shape of the ABS of a slider 51 and three-dimensional positions of measured points.

Figure 20:
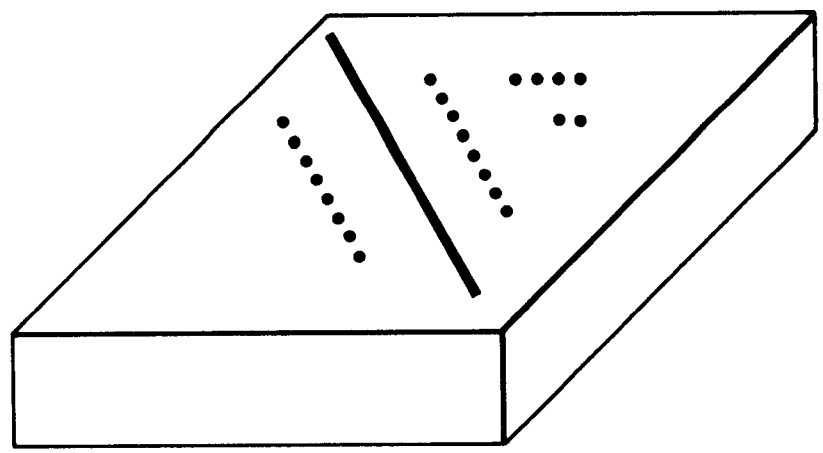
FIG. 20 is a view for explaining an example of a case where a line-shaped processing, a point-shaped processing, and a processing of suitably applying energy to points are combined, according to still another embodiment of the present invention.

FIG. 20 is a view that shows a case of correcting an ABS by suitably combining the irradiation of energy onto a plurality of lines in a line shape as shown in FIG. 17, the irradiation of energy onto points on a plurality of lines as shown in FIG. 18, and suitably applying energy onto points based on a difference as shown in FIG. 19, according to still another embodiment of the present invention.

Figure 21:
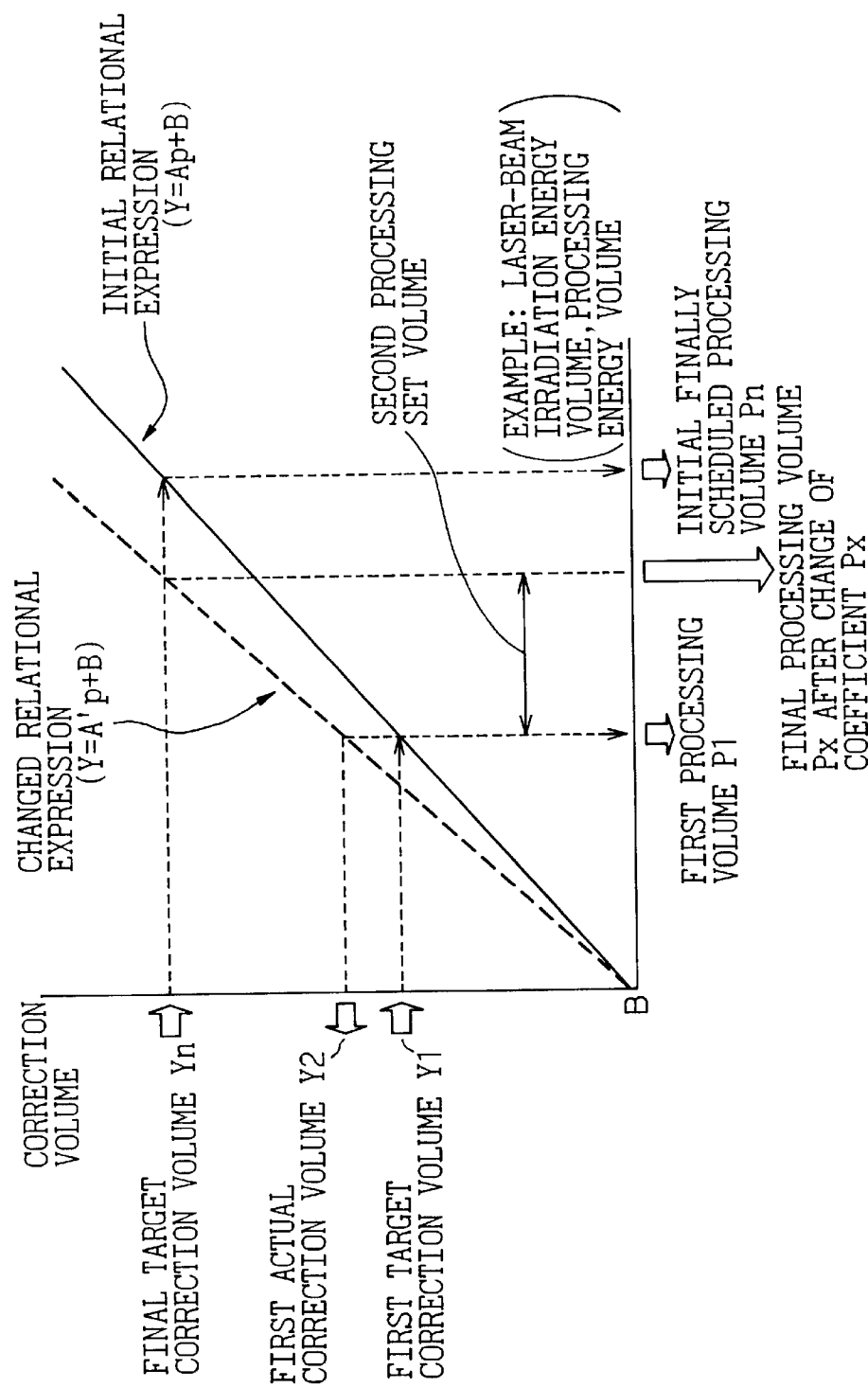
FIG. 21 is a graph showing a principle of a correction processing for carrying out a processing by a plurality of times to achieve a more precise correction of an ABS.

FIG. 21 is a graph showing a principle of a correction processing for carrying out a process a plurality of times in order to achieve a more precise correction of an ABS. In FIG. 21, the horizontal axis represents a processing volume (volume of processing energy) for determining processing conditions, and a vertical axis represents a correction volume. A correction volume and a processing volume at an initial state is obtained in advance by an initial relational expression Y=Ap+B. This relationship is held in the database. In this expression, Y represents a correction volume, p represents a processing volume, A represents a coefficient, and B represents a constant. This relational expression is given by a solid straight line in FIG. 21. A volume of energy corresponding to the correction volume is determined from this straight line. More specifically, a first processing is carried out based on a first processing volume p1 corresponding to a first target correction volume Y1 that is smaller than a final target correction volume Yn. The final target correction volume Yn is a difference d between a three-dimensional position of the processing centerline and either a maximum height or a minimum height of the ABS as shown in FIG. 11. After finishing the first processing, the ABS shape is measured again by the above-described method, and a result is evaluated to obtain a first actual correction volume Y2. Then, there is obtained a new relational expression (a changed relational expression) Y=A'p+B that satisfies the actual correction volume Y2 and the first correction volume p1. In this expression, A' represents a coefficient after the change. This new relational expression is given by a dotted straight line in FIG. 21. Based on the relational expression given by this dotted straight line, a processing volume after the change of the coefficient (a final processing volume px after the change of the coefficient) is obtained for obtaining a second target correction volume (a final correction volume in the example of FIG. 21). Then, a difference between the second processing volume px and the first processing volume p1 is set as a second processing set volume.

While FIG. 21 shows an example of the case of carrying out the processing two times, it is possible to achieve a further fine correction of the ABS by repeating a similar processing three or more times.

For correcting a slider or a slider within a rowbar formed by a plurality of sliders, a first correction can be carried out using a coefficient that has been used in the correction processing immediately before, as a coefficient of a relational expression.

Figure 22:
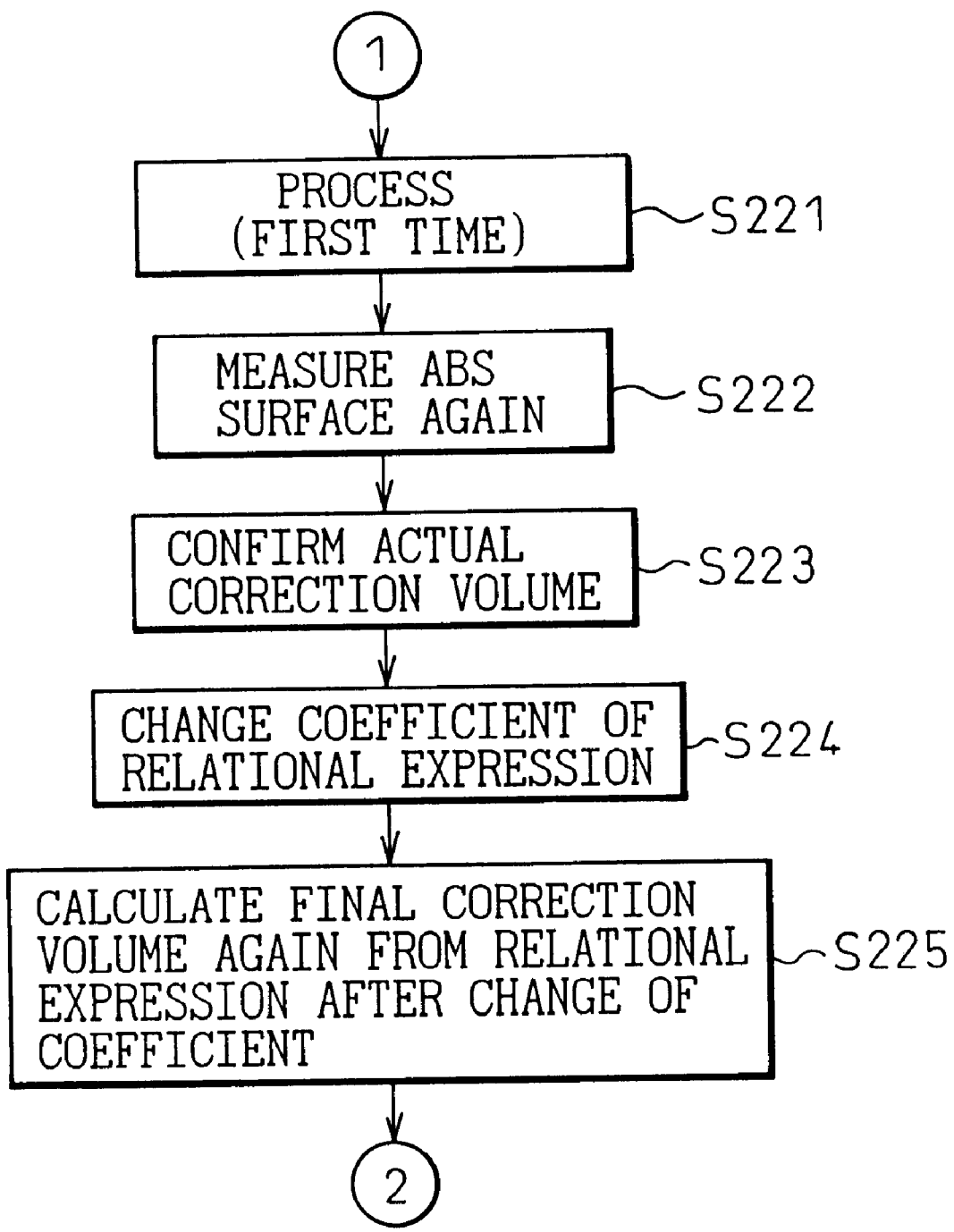
FIG. 22 is a flowchart for explaining a part of a processing carried out by a plurality of times shown in FIG. 21.

FIG. 22 is a flowchart for explaining a part of a processing carried out a plurality of times as shown in FIG. 21. Referring to FIG. 22, at step S221, a first processing of the ABS is carried out according to the correction conditions (that is, the processing conditions) determined at step S45 in FIG. 4. From the initial relational expression, the first processing volume p1 corresponding to the first target correction volume Y1 and an initial finally scheduled processing volume pn corresponding to the final target correction volume Yn are obtained.

Next, at step S222, the ABS is measured again in a similar manner to that at step S41 in FIG. 4. At step S223, the actual correction volume Y2 is confirmed in a similar manner to that at step S43 in FIG. 4.

At step S224, the changed relational expression Y=A'p+B given by the dotted line in FIG. 22 is obtained from the actual correction volume Y2 and the first correction volume p1. At step S225, from this changed relational expression, the final processing volume px, after the change of the coefficient, is obtained corresponding to the final target correction volume Yn.

Figure 23:
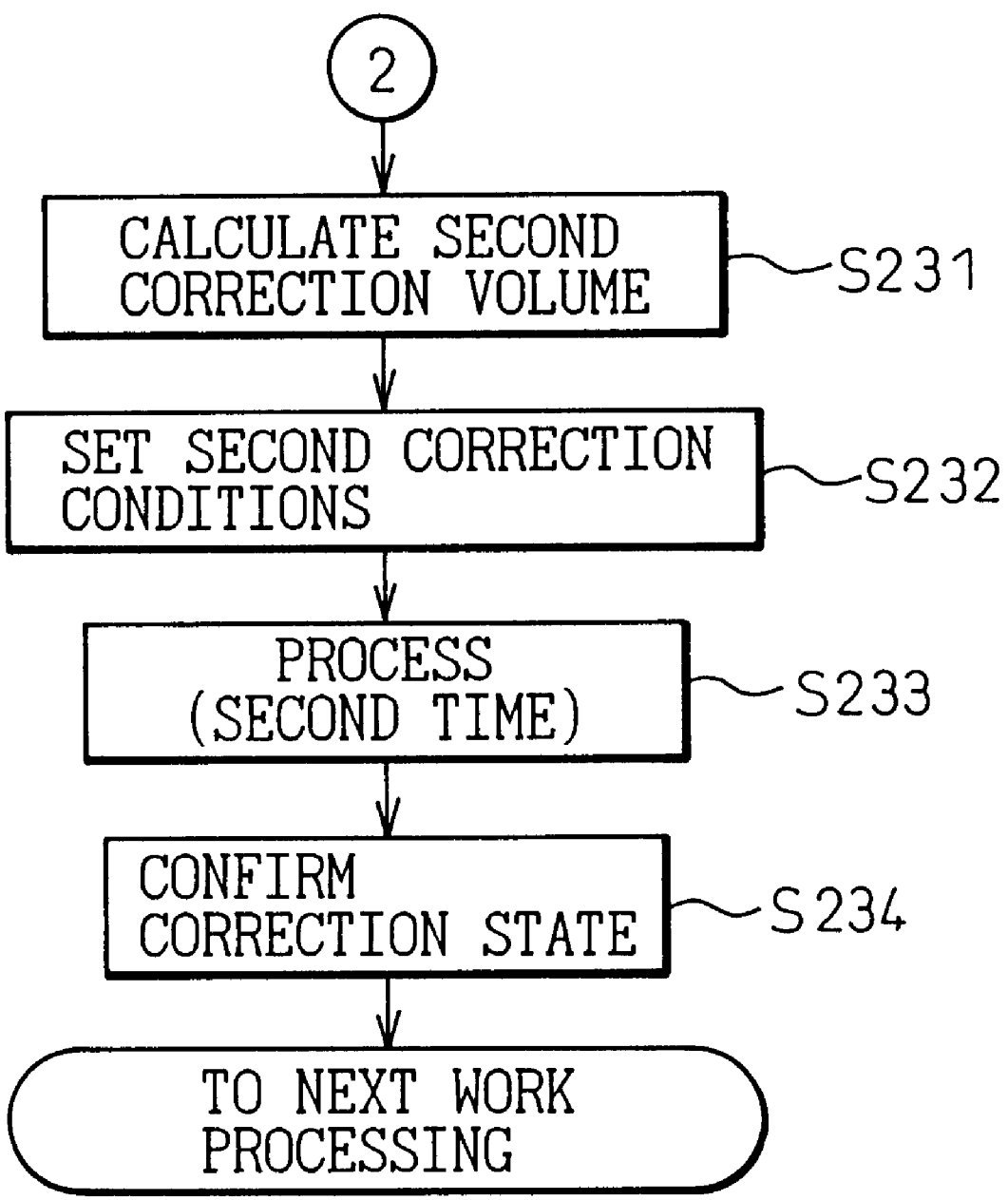
FIG. 23 is a flowchart for explaining a part of a processing carried out by a plurality of times shown in FIG. 21.

Next, at step S231 in FIG. 23, a second processing set volume is calculated that is a difference between the final processing volume px, after the change of the coefficient, and the first processing volume p1.

Next, at step S232, the second correction conditions are set, and at step S233, the second process is carried out. At step S234, the correction state is checked. When the correction state is satisfactory, the processing proceeds to the next work process.

While the ABS is corrected into the target ABS shape at the second correction processing in the above example, the correction may be carried out any number of times. Generally describing, when n is an integer of 3 or above, a target correction volume of the n-th correction as a difference from the shape of the (n−1)-th correction is obtained from the relational expression that has a changed coefficient. A difference between the (n−1)-th conditions and the n-th conditions is set as the n-th processing conditions.

The correction volume at each time may be any volume within the final target correction volume. For example, when the final target correction volume is a large value, the initial correction volume may be larger, and the correction volume is made smaller toward the final stage.

According to the present invention, there is also provided a magnetic head that is obtained by the above-described method.

Further, according to the present invention, there is also provided an ABS shape correction apparatus that implements the above-described method.

Figure 24:
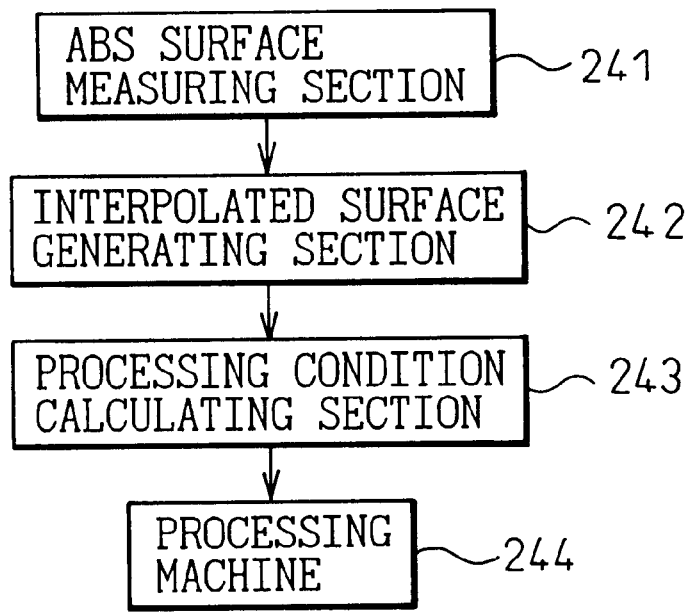
FIG. 24 is a schematic block diagram of an ABS shape correction apparatus according to one embodiment of the present invention.

FIG. 24 is a schematic block diagram of an ABS shape correction apparatus according to one embodiment of the present invention. In FIG. 24, the ABS shape correction apparatus includes an ABS measuring section 241 that measures a position on an ABS of a slider of a magnetic head, an interpolated surface generating section 242 that generates an interpolated surface obtained by interpolating the whole measured points based on data obtained by the measurement, a processing condition calculating section 243 that calculates a processing center position of the magnetic head based on the interpolated surface, and a processing machine 244 that processes a plurality of lines parallel with the processing center position.

The ABS shape correction apparatus operates in the method as described above, and therefore, the explanation of the operation will be omitted here.

Figure 25:
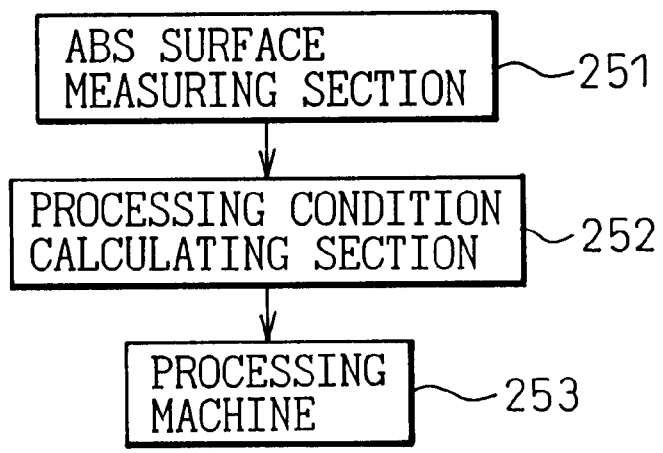
FIG. 25 is a schematic block diagram of an ABS shape correction apparatus according to another embodiment of the present invention.

FIG. 25 is a schematic block diagram of an ABS shape correction apparatus according to another embodiment of the present invention. In FIG. 25, the ABS shape correction apparatus includes an ABS measuring section 251 that measures a three-dimensional position on an ABS of a slider of a magnetic head, a processing condition calculating section 252 that calculates a difference between the data obtained by the measurement and a three-dimensional position of a final correction shape, and a processing machine 253 that processes the ABS by applying energy of a size corresponding to this difference onto the corresponding points on the ABS.

Figure 26:
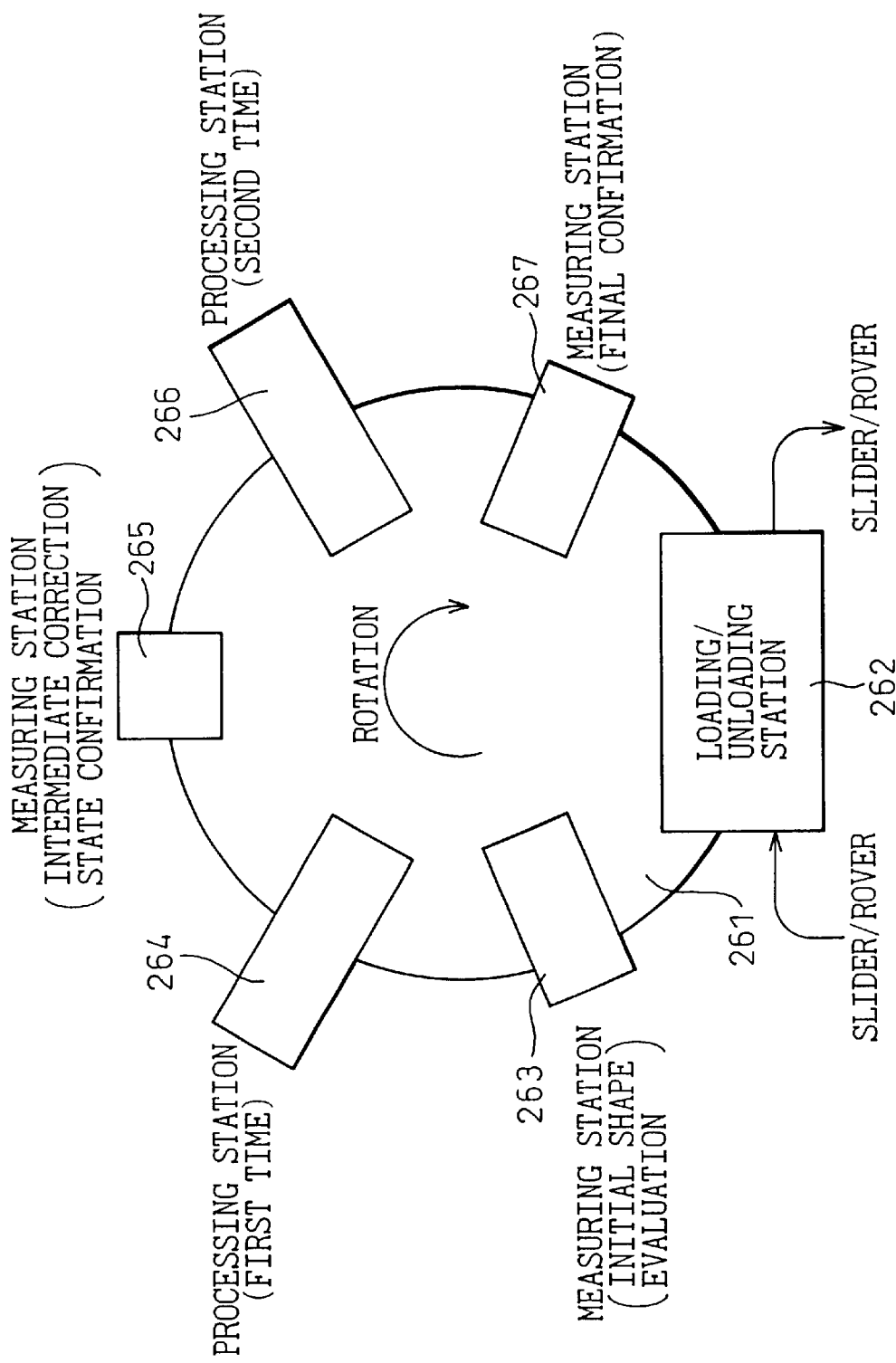
FIG. 26 is a schematic view showing an outline of an ABS shape correction apparatus that can be suitably applied to a mass production line according to the embodiment of the present invention.

FIG. 26 is a schematic view showing an outline of an ABS shape correction apparatus that can be suitably applied to a mass production line according to the embodiment of the present invention. In FIG. 26, a reference number 261 denotes a rotary plate, 262 denotes a loading/unloading station for loading a slider or a rowbar of which ABS is to be corrected onto this apparatus or unloading it from the apparatus, 263 denotes a measuring station for evaluating an initial shape, 264 denotes a processing station for carrying out a first processing, 265 denotes a measuring station for measuring an intermediate correction state, 266 denotes a processing station for carrying out a second processing, and 267 denotes a measuring station for carrying out a final confirmation.

The rotary plate 261 rotates in synchronism with the correction processing speed of correcting the ABS of the slider or the rowbar. Based on this structure, a plurality of sliders or rowbars can be loaded onto the loading/unloading station 262. The sliders or rowbars that have been processed are continuously taken out from the loading/unloading station 262.

The measuring station 263 includes the ABS measuring section 241, the interpolated surface generating section 242, and the processing condition calculating section 243 shown in FIG. 24, and evaluates the initial shape by the above-described method.

The processing station 264 includes the processing machine 244 shown in FIG. 24, and carries out a first processing of the ABS according to the initial shape of the ABS.

The measuring station 265 also includes the ABS measuring section 241, the interpolated surface generating section 242, and the processing condition calculating section 243 shown in FIG. 24, and confirms an intermediate correction state by the above-described method.

The processing station 265 also includes the processing machine 244 shown in FIG. 24, and carries out a second processing of the ABS according to the intermediate correction state of the ABS.

The measuring station 267 also includes the ABS measuring section 241, the interpolated surface generating section 242, and the processing condition calculating section 243 shown in FIG. 24, and carries out a final confirmation by the above-described method.

Each measuring station and each processing station may be equipped with the ABS measuring section 251 and the processing condition calculating section 252 shown in FIG. 25 respectively in place of the ABS measuring section 241, the interpolated surface generating section 242, and the processing condition calculating section 243.

As is clear from the above explanation, according to the present invention, the processing center position is determined based on shape characteristics of the ABS whole surface. Therefore, it is possible to provide an ABS shape correction method, for a slider of a magnetic head, capable of carrying out a stable correction of the ABS with high precision despite changes in the surface state of the slider, the components of materials and the characteristics of a processing machine, and to provide a magnetic head having an ABS corrected by this method, and an ABS shape correction apparatus for a slider of a magnetic head.

Further, according to the present invention, the whole shape of the slider is interpolated by the primary and secondary interpolated surfaces. Therefore, it becomes possible to carry out a numerical evaluation equivalent to the conventional evaluation of an ABS for the values of crown, camber and twist.

Further, according to the present invention, the coefficient of a relational expression for expressing the processing characteristics is matched with an actual processing result for each time of processing. Therefore, it is possible to suitably set optimum conditions for a processing tool by taking into account changes in processing characteristics and changes in characteristics of processed materials due to a lapse of time.

Further, when a rotary table structure is employed, it is easy to apply the present invention to a mass production line.

What is claimed is:

1. An ABS shape correction method for a slider of a magnetic head, comprising:
    a first step for measuring a three-dimensional position on an ABS of a slider of a magnetic head;
    a second step for generating an interpolated surface obtained by interpolating the whole measured points from data obtained by the measurement;
    a third step for calculating a processing center position of the magnetic head based on the interpolated surface; and
    a fourth step for processing a plurality of lines parallel with the processing center position;
    wherein the first step is a step for measuring a shape of the surface of a floating surface rail as the ABS, as three-dimensional line data.

2. The method according to claim 1, wherein the second step is a step for covering the whole surface of the slider from the line data obtained by the measurement, and for generating an interpolated surface of a second or higher level of degree by smoothly interpolating the whole measured points.

3. An ABS shape correction method for a slider of a magnetic head, comprising:
    a first step for measuring a three-dimensional position on an ABS of a slider of a magnetic head;
    a second step for generating an interpolated surface obtained by interpolating the whole measured points from data obtained by the measurement;
    a third step for calculating a processing center position of the magnetic head based on the interpolated surface; and
    a fourth step for processing a plurality of lines parallel with the processing center position;
    wherein the first step is a step for measuring a shape of a floating surface before a floating surface rail surface of the ABS is formed, as three-dimensional point data.

4. An ABS shape correction method for a slider of a magnetic head, comprising:
    a first step for measuring a three-dimensional position on an ABS of a slider of a magnetic head;
    a second step for generating an interpolated surface obtained by interpolating the whole measured points from data obtained by the measurement;
    a third step for calculating a processing center position of the magnetic head based on the interpolated surface; and
    a fourth step for processing a plurality of lines parallel with the processing center position;
    wherein the first step is a step for measuring a shape of a floating surface before a floating surface rail surface of the ABS is formed, as three-dimensional line data.

5. An ABS shape correction method for a slider of a magnetic head, comprising:
    a first step for measuring a three-dimensional position on an ABS of a slider of a magnetic head; and
    a second step for processing the ABS by suitably giving energy to points according to a difference between data obtained by the measurement and a three-dimensional position of a final correction shape.

6. An ABS shape correction apparatus for a slider of a magnetic head, comprising:
    an ABS measuring section that measures a three-dimensional position on an ABS of a slider of a magnetic head;
    a processing condition calculating section that calculates a difference between data obtained by the measurement and a three-dimensional position of a final correction shape; and
    a processing machine that processes the ABS by applying energy of a size corresponding to the difference onto corresponding points on the ABS.

* * * * *